US009819991B1

(12) United States Patent
Rajagopalan et al.

(10) Patent No.: US 9,819,991 B1
(45) Date of Patent: Nov. 14, 2017

(54) ADAPTIVE IMPEDANCE MATCHING INTERFACE

(71) Applicant: Amazon Technologies, Inc., Seattle, WA (US)

(72) Inventors: Jagan Vaidyanathan Rajagopalan, San Jose, CA (US); Akshay Mohan, San Jose, CA (US); Mudit Sunilkumar Khasgiwala, San Jose, CA (US); Duck Ho Bae, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/056,954

(22) Filed: Feb. 29, 2016

(51) Int. Cl.
H04N 7/00 (2011.01)
H04N 11/00 (2006.01)
H04N 21/426 (2011.01)
H04N 5/21 (2006.01)
H04N 21/4363 (2011.01)

(52) U.S. Cl.
CPC ......... H04N 21/42607 (2013.01); H04N 5/21 (2013.01); H04N 21/43635 (2013.01)

(58) Field of Classification Search
CPC ....... H04N 21/43635; H04N 21/42607; H04N 21/65; H04N 21/4316; H04N 5/21; H04N 5/775; H04N 5/7755; H04N 5/765; H04N 5/44
USPC ..... 348/497, 333.01, 333.02, 372, 377, 532, 348/571, 664, 705, 706, 714, 719, 723, 348/725, 730, 733, 737, 739, 785, 207.1, 348/207.2, 231.3, 130, 126, 87, 75, 14.11; 361/9, 15, 21, 33, 56, 58, 86, 188, 270; 386/231, 243, 335; 725/117, 127, 118, 725/131; 455/13.3, 19, 25, 63.4, 83
See application file for complete search history.

(56) References Cited

U.S. PATENT DOCUMENTS

| 2009/0141180 | A1* | 6/2009 | Kondo | G09G 5/006 348/723 |
| 2009/0238537 | A1* | 9/2009 | Kinoshita | H04N 5/44 386/213 |
| 2009/0256963 | A1* | 10/2009 | Sato | H04N 5/4401 348/554 |
| 2010/0141845 | A1* | 6/2010 | Kikkawa | G09G 5/003 348/706 |
| 2011/0066777 | A1* | 3/2011 | Della Pia | G06F 1/1626 710/106 |

(Continued)

Primary Examiner — Jefferey F Harold
Assistant Examiner — Mustafizur Rahman
(74) Attorney, Agent, or Firm — Lowenstein Sandler LLP

(57) ABSTRACT

A device is described. The device includes a data interface connector, an application processor, and interface circuitry. The application processor can receive signals via an antenna. The interface circuitry can be coupled between the application processor and the data interface connector. The data interface circuitry can determine a change in a signal property of one of the signals, the change being caused by an impedance mismatch between the data interface connector and a media consumption device. The data interface circuitry can also send the application processor a signal property setting corresponding with the change. The application processor can adjust the signal property of a subsequent one of the signals, in response to the signal property setting from the interface circuitry, to obtain an adjusted signal. The application processor can also send the adjusted signal to the media consumption device.

20 Claims, 8 Drawing Sheets

(56) References Cited

U.S. PATENT DOCUMENTS

| | | | |
|---|---|---|---|
| 2011/0149158 A1* | 6/2011 | Cooper | H04N 5/44 348/552 |
| 2011/0167465 A1* | 7/2011 | Higuchi | G09G 5/006 725/117 |
| 2012/0002116 A1* | 1/2012 | Morris | H04N 5/50 348/731 |
| 2012/0069535 A1* | 3/2012 | Cai | H04N 5/775 361/752 |
| 2012/0243158 A1* | 9/2012 | Gentil | G09G 5/006 361/679.03 |
| 2014/0133077 A1* | 5/2014 | Huang | G06F 1/18 361/679.4 |
| 2016/0142647 A1* | 5/2016 | Gopinath | H04N 5/765 348/706 |

* cited by examiner

ADAPTIVE IMPEDANCE MATCHING INTERFACE

BACKGROUND

A large and growing population of users is enjoying entertainment through the consumption of media items, such as music, movies, images, electronic books, and so on. The users employ various electronic devices to consume such media items. Among these electronic devices are electronic book readers, cellular telephones, personal digital assistants (PDAs), portable media players, tablet computers, netbooks, laptops and the like. However, some electronic devices lack a capability to access the media items, such as streaming or on-demand media items. Adapters can be used to connect these electronic devices with a media content distribution infrastructure to enable the consumption of the media items.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
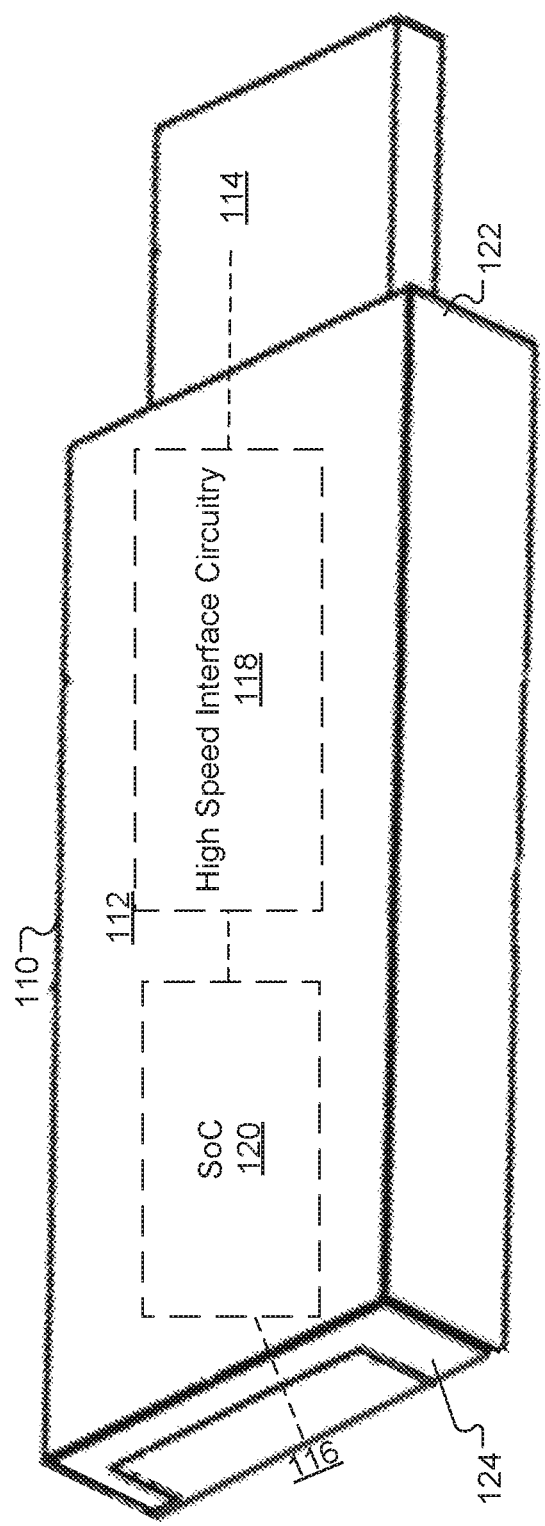
FIG. 1 illustrates a perspective view of an electronic device according to one embodiment.

Media consumption devices can access increasing amounts of content, such audio content, video content, text, and pictures. Users of media consumption devices increasingly desire devices with increased functionality and performance to access on demand media content. Streaming involves continuously displaying media content to a user while the content is being delivered to the user. Streaming can be used to deliver various types of media to end-users including recorded or on-demand content and live media content. With the increased demand for access to on demand content, electronic devices can be used to provide media consumption devices access to on-demand content.

Conventional media consumption devices may lack a capability to access media items, such as streaming media items. For example, a conventional media consumption device may not have an antenna to access a wireless network or a processor to communicate with a server. Media items can be a portion or segment of media content. In one example, the media item may be a segment of a television show, a full television show, a segment of a movie, a full-length movie. In another example, the media item may be media content streamed for a period of time. The word "media" and some compound words that include "media" (e.g., media, media content, or hypermedia) may refer to media content, rather than to the channel through which the information is delivered to the end user/audience. An example of a type of content commonly referred to as a type of media is a "motion picture" referred to as "a film." The media items can include video data, audio data, graphic data, and so forth.

An electronic device can be used to connect a media consumption device to a media content distribution infrastructure to access to the media items. For example, the electronic device can be an adapter with a processing device and an antenna to retrieve media items from the media content distribution infrastructure and relay the retrieved media items to the media consumption device. A media content server can then receive and transmit media content streams over a network to the electronic device. The electronic device can include a client-side player that decompresses and displays the media item to an end-user via conventional media consumption devices. However, the electronic device distributing the media content to the conventional media consumption device can be challenging. For example, users desire compact portable adapters with complex processing power to provide higher resolution content, complex images, interactive content, increased functionality, and streaming video to create a rich visual experience for the user. Additionally, different media consumption devices can have different playback capabilities, screen sizes, screen resolutions, electronic circuitry, audio/video or data interfaces, and so forth.

The complexity of the electronic devices and the media content as well as the varying configurations of the media consumption devices can cause stuttering, skipping, pausing, and other undesirable playback effects for the end user. For example, the electronic device can include a high speed interface to connect with the media consumption device. The high speed interface can include: a high-definition multimedia interface (HDMI) connector; a universal serial bus (USB) connector, such as USB 3.0 or USB C; or a peripheral component interconnect express (PCIe) connector. Using the high speed interface to relay media items can be challenging because it operates at a high frequency of operation (such as greater than 3 gigahertz) and has a tight impedance requirement (such as 100 ohms+/−10%). Different high speed interfaces can radiate on different signal lines and have varying frequencies of operation. The various media consumption devices that the electronic device connects to cause different impedance loads that create impedance mismatching at the high speed interface due to varying impedance loads. For example, different brands of televisions (TVs) can have different HDMI interfaces and different brands of hard disks.

The impedance mismatch can cause the electronic device to radiate spurious emissions. Spurious emissions are emissions from the electronic device on a frequency or frequencies that are outside a frequency bandwidth and level used by the electronic device. The spurious emissions can interfere with the electronic device receiving media items via a wireless network and can cause stuttering, skipping, pausing, and other undesirable video playback. The spurious emissions may be reduced without affecting a corresponding transmission of information by the electronic device. Spurious emissions can include harmonic emissions, parasitic emissions, intermodulation products and frequency conversion products, and out-of-band emissions. In one embodiment, the spurious emissions can range in frequency from 30 megahertz (MHz) to 12.5 gigahertz (GHz). The impedance mismatch from the different loads and other signal characteristics of the media consumption devices can also cause signal integrity failures when displaying media items.

The embodiments described herein may address the above noted deficiencies by an electronic device employing signal shaping circuit to match impedance loads of different media consumption devices with the electronic device. One advantage of the signal shaping circuit is to reduce or eliminate spurious emissions by modify and correct the impedance of interface for different loads. The electronic device can also include a variable filter to filter noise coupling to antennas of the electronic device for different quality profiles. The quality profile can include: video resolution levels of the media items, an image size of the media item, a bit rate of the media item, an audio quality of the media item, a sound level of the media item, and so forth. One advantage of the variable filter is to increase integrity of a signal by reducing or eliminating noise caused by different video resolution levels. The reduction or elimination of spurious emissions and the increase in the integrity of the signal can reduce or eliminate stuttering or breakage in a media item sent from the electronic device to be displayed on the media consumption device, such as a video display device.

FIG. 1A illustrates a perspective view of an electronic device 110 according to one embodiment. The electronic device 110 can include a housing 112, a high speed interface connector 114, an antenna 116, a high speed interface circuitry 118, and a system on a chip (SoC) 120. In one embodiment, the high speed interface connector 114 can be integrated into a first end 122 of the housing 112. In another embodiment, the high speed interface connector 114 can include a male high speed interface connector sized and shaped to connect to a female high speed interface receiver. The high speed interface connector 114 can be a HDMI connector, a USB connector, a micro USB connector, a mini USB connector, a PCIe connector, a thunderbolt connector, a video graphics array (VGA) connector, a musical instruments digital interface (MIDI) connector, a parallel port, a serial port, and so forth. In another embodiment, the high speed interface connector 114 can communicate media items to a display of a media consumption device.

In one embodiment, the antenna 116 can receive content from a content feed. The content feed can be a server, a cloud storage device, a website, an over the air broadcast, and so forth. In another embodiment, the antenna 116 can be integrated into a second end 124 of the housing 112.

The high speed interface circuitry 118 can be located within the housing 112. In one example, the high speed interface circuitry 118 can integrated onto a printed circuit board (PCB) or be part of the SoC 120. In another example, the high speed interface circuitry 118 can be coupled to the high speed interface connector 114. In another embodiment, the high speed interface circuitry 118 can be coupled to the SoC 120. The SoC 120 can be located within the housing 112. For example, the SoC 120 can be integrated onto a printed circuit board (PCB) or be part of a processing device. In one embodiment, the high speed interface circuitry 118 can be coupled to the high speed interface circuitry 118. In another embodiment, the SoC 120 can be coupled to the antenna 116.

Figure 2A:
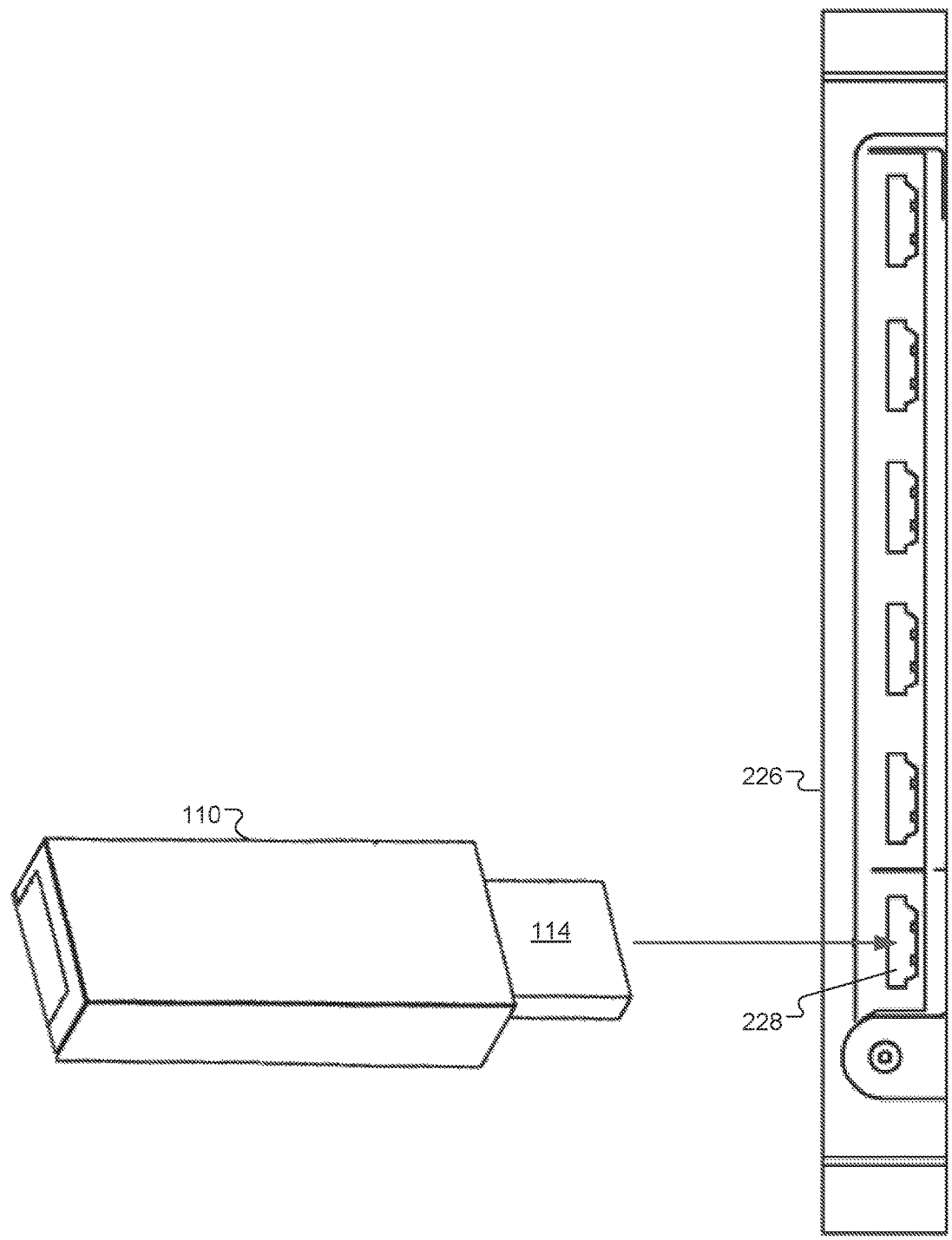
FIG. 2A illustrates the electronic device connecting to a media consumption device according to one embodiment.

FIG. 2A illustrates the electronic device 110 connecting to a media consumption device 226 according to one embodiment. Some numbers in FIG. 2A are similar to some numbers in FIGS. 1A and 1B as noted by similar reference numbers, unless expressly described otherwise. In one embodiment, the high speed interface connector 114 of the electronic device 110 can connect to the media consumption device 226 via a high speed interface receiver 228. In one example, the high speed interface connector 114 can be a male HDMI connector and the high speed interface receiver 228 can be a female HDMI receiver. The high speed interface connector 114 can plug into the high speed interface receiver 228 to provide the media consumption device 226 access to media item. In one embodiment, the media consumption device 226 can be a TV with an HDMI port.

The electronic device 110 can also include a power management system to provide power to the electronic device 110. In one example, the power management system can receive power via the high speed interface connector 114. In another example, the power management system can receive power via a power outlet, such as a wall outlet. In another embodiment, the media consumption device 226 can be a smartphone, a tablet, a computer, a computing device, or a processing device with a port that can receive the electronic device 110.

Figure 2B:
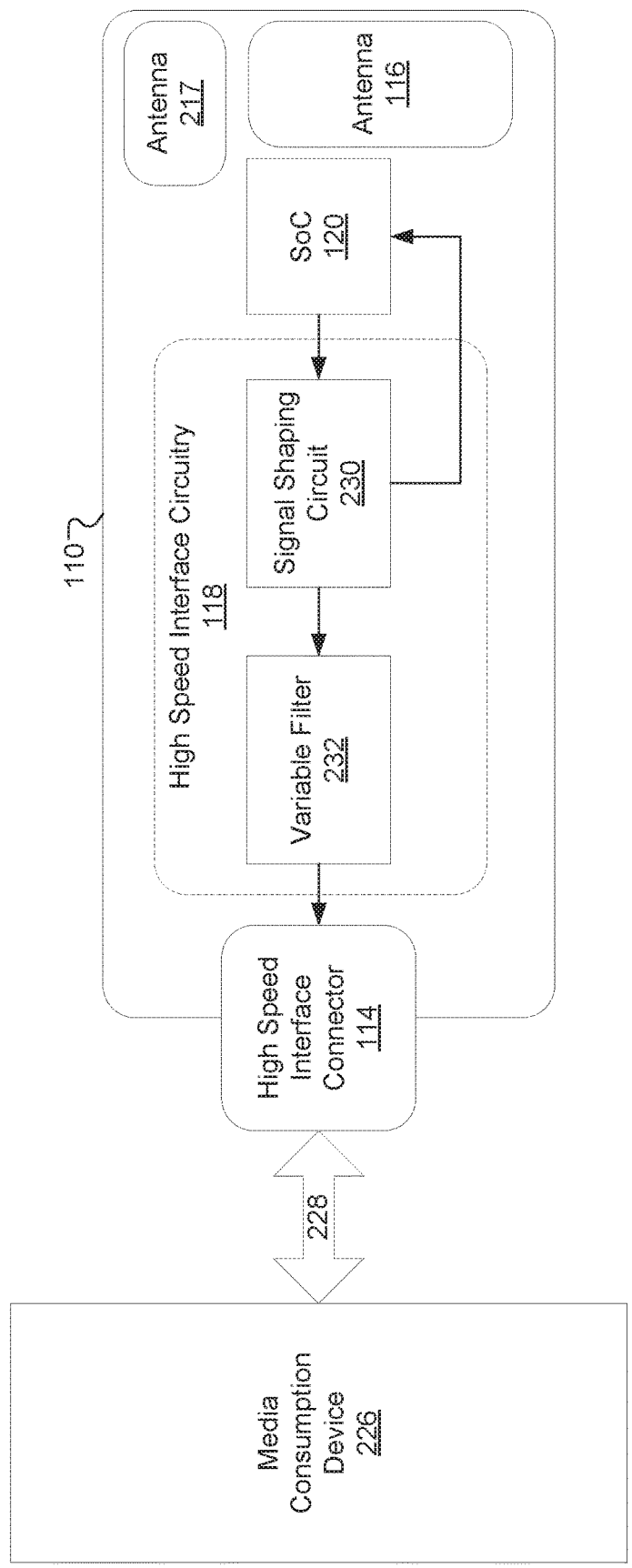
FIG. 2B illustrates an exposed view of the electronic device connecting to a media consumption device according to one embodiment.

FIG. 2B illustrates an exposed view of the electronic device 110 connecting to a media consumption device 226 according to one embodiment. Some numbers in FIG. 2B are similar to some numbers in FIGS. 1A, 1B, and 2A as noted by similar reference numbers, unless expressly described otherwise. The electronic device 110 can include the antennas 116 and 217, the SoC 120, the high speed interface circuitry 118, and the high speed interface connector 114. The electronic device 110 can be connected to the media consumption device 226 as discussed in the preceding paragraphs.

In one embodiment, the SoC 120 can be an application processor. The SoC 120 can include a look-up table (LUT) to store data. For example, the look-up table can store information for impedance profiles of different media consumption devices 226, the high speed interface connectors 114, the high speed interface receiver 228, a cable connecting the high speed interface connectors 114 to the high speed interface receiver 228, or a combination thereof. In one embodiment, the impedance profiles can be predetermined impedance data for different media consumption devices and/or high speed interface connectors. For example, the electronic device 110 can be connected to different media consumption devices 226 via different high speed interface receivers 228. In this example, impedance data can be recorded to the LUT as different impedance profiles for the associated electronic device 110 when connected to the different media consumption devices 226 via different high speed interface receivers 228.

As the electronic device 110 is connected to the different media consumption devices 226 via the different high speed interface receivers 228, signal properties of the signal for the media item can change. In one example, the signal can be a media signal for the media item. In another example, the signal can be a video signal for a media item that is a video item. The signal properties can change based on the impedance loads from the media consumption devices 226 and the high speed interface receivers. For example, the impedance loads can be a portion the impedance load contributed by an impedance load of the media consumption device, a portion of the impedance load contributed a high speed interface receiver coupled to a media consumption device, or a combination thereof. The signal properties can include a waveform shape for the signal, a peak to peak voltage swing of the signal, a current draw from the SoC for the signal, or a quality profile of a media item. In one example, a first impedance profile associated with a first impedance load value and a second profile associated with a second impedance load value can be stored in the LUT of the SoC 120, where the first impedance load value is associated with a first media consumption device and the second impedance load value is associated with a second media consumption device. In this example, the first impedance load and the second impedance load change a signal property of the signal for the media item.

In another embodiment, the impedance profiles can be predetermined profiles for various impedance levels, regardless of the different media consumption devices 226 or the different high speed interface receivers 228 used. For example, the impedance data can include configuration information for a signal shaping circuit 230 to adjust a signal of a media item, as discussed in greater detail in the proceeding paragraphs. As the impedance load from the media consumption device 226 or the high speed interface receiver 228 changes, the signal shaping circuit 230 can compare the impedance level from the media consumption device 226 with the impedance profiles and select an impedance profile with a similar impedance load value.

In another embodiment, the look-up table can store information for filter profiles of different quality profiles. In another embodiment, the filter profiles can include a power level of a signal sent to the media consumption device 226. For example, the SoC 120 can store a voltage level to send a media item to the media consumption device 226 for different quality profiles. The quality profiles can include video resolution levels, such as 720 pixels of vertical resolution (720P), 1080P, 4000 pixels of vertical resolution (4K), 8K, and so forth. In one embodiment, the filter profiles can be predetermined filter configurations for the different quality profiles. For example, the electronic device 110 can be connected to the media consumption device 226. In this example, filter data can be recorded to the look-up table as different quality profiles are used when displaying the media items on the media consumption device 226. For example, when a media item is displayed on the media consumption device 226 at a first resolution level with minimal or zero noise, the electronic device can record the filter settings for the first resolution level. In another example, when the media item is displayed on the media consumption device 226 at a second resolution level with minimal or zero noise, the electronic device can record the filter settings for the second resolution level.

The SoC 120 can be connected to the high speed interface circuitry 118. In one embodiment, the high speed interface circuitry 118 can include the signal shaping circuit 230. The signal shaping circuit 230 can shape a signal for a media item using an impedance profile associated with the media consumption device 226 and/or the high speed interface receiver 228. For example, the signal shaping circuit 230 can condition a HDMI traffic that is received via the antenna 116 or 217 and is to be sent to the media consumption device 226. The signal shaping circuit 230 can receive shaping instructions on how to shape a signal of the media item from the SoC 120. The shaping instructions can be instructions on how to shape a signal to correct for an impedance mismatch for an impedance profile. Impedance matching is a matching of impedances levels at both sides of a junction, such as an HDMI connection point, to be at approximately the same impedance level.

The signal shaping circuit 230 can detects the changes in the impedance load value for the media consumption device 226 and/or the high speed interface receiver 228 by tracking the load impedance from the media consumption device 226 and/or the high speed interface receiver 228 and estimating the load impedance as the signal is sent to the media consumption device 226. To match the impedance loads, the impedance of the electronic device is matched with a line impedance and load impedance of the media consumption device. In one example, the SoC 120 can change a drive strength of the signal based on the input from the signal shaping circuit 230. In one example, when the impedance level of the media consumption device 226 and the high speed interface receiver 228 is matched to the electronic device 110, the impedance level can be 100 ohms. An advantage of shaping the signal to correct the impedance mismatch can be to reduce spurious emissions and increase an integrity of the signal. When the impedance mismatch is corrected, there is not a swing in the signal causing flickering or stuttering when displaying the signal from the media consumption device.

Figure 2C:
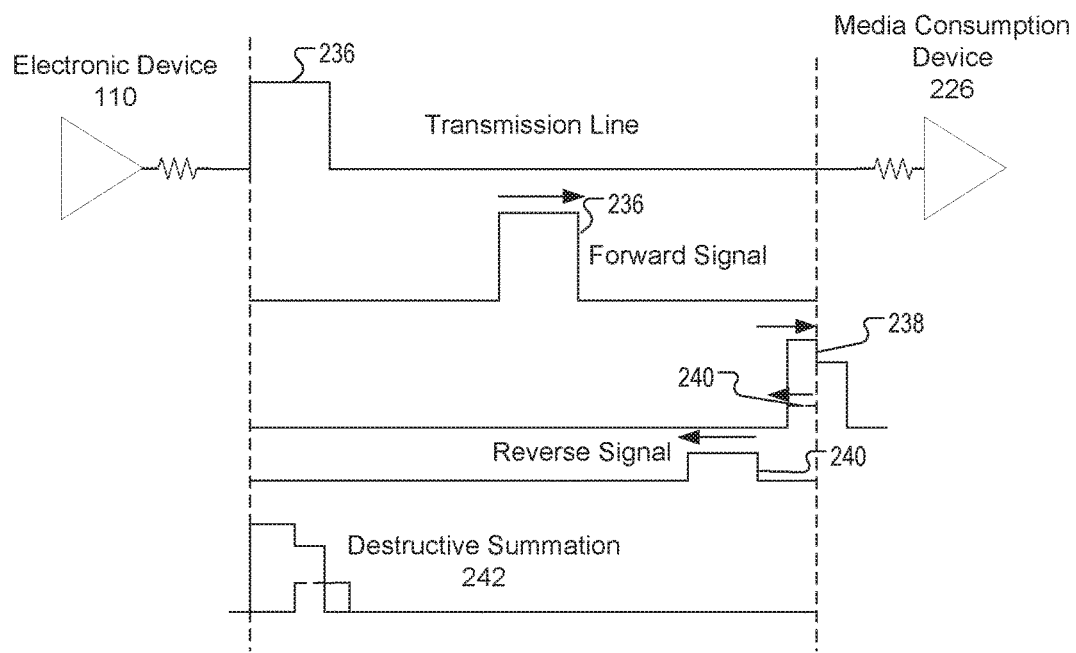
FIG. 2C illustrates an impedance mismatch between the electronic device and the media consumption device according to one embodiment.

FIG. 2C illustrates an impedance mismatch between the electronic device 110 and the media consumption device 226 according to one embodiment. Some numbers in FIG. 2C are similar to some numbers in FIGS. 2A and 2B as noted by similar reference numbers, unless expressly described otherwise. The electronic device 110 can be connected to the media consumption device 226 by a transmission line. The electronic device 110 can send a signal 236 for the media item to the media consumption device 226 over the transmission line. The media consumption device 226 and the transmission line can have different impedances.

The signal that is sent from the electronic device 110 to the media consumption device 226 is a forward signal that travels down the transmission line. When the signal reaches the media consumption device 226 and there is an impedance mismatch 238, a reverse signal 240 can be reflected back to the electronic device 110. For example, as the signal hits the load of the media consumption device 226, a difference in impedances causes part of the signal to bounce back or reflect from the load. The reflected signal is a reverse signal that an inverted from the forward signal and travels back toward the electronic device 110 along the transmission line. The amplitude of the reverse signal is based on the degree that the impedances mismatch. For example, as the impedance mismatch between the electronic device 110 and the media consumption device 226 or the transmission line increases, the level that the impedance mismatches increases.

As the reverse signal travels along the transmission line, the reverse signal will collide with the forward signal. Where the collision occurs can be based on a pulse or bit rate of the signal and a length of the transmission line. When the forward and reverse signals collide, the forward signal will be altered as it interacts with the reverse signal. For example, the interaction between the forward and reverse signals can cause a destructive summation 242, where the out-of-phase reverse signal cancels at least a portion of the forward signal. The destructive summation 242 from the impedance mismatch can cause the signal for the media item to flicker or stutter when the signal is displayed on the media consumption device 226. The signal shaping circuit 230 can adjust an amplitude of the signals to reduce an amplitude of the reverse signal. For example, a peak-to-peak amplitude of the voltage of the signals can be reduced to reduce the peak to peak amplitude of the voltage of the reverse signal to approximately zero. In one example, the amplitude of the voltage can be a measure of a peak-to-peak value of the voltage level of the signal. In another example, the amplitude of the voltage can be a measure of a deviation of the voltage level of the signal from a zero baseline-value, e.g., half of the peak-to-peak value.

Figure 2D:
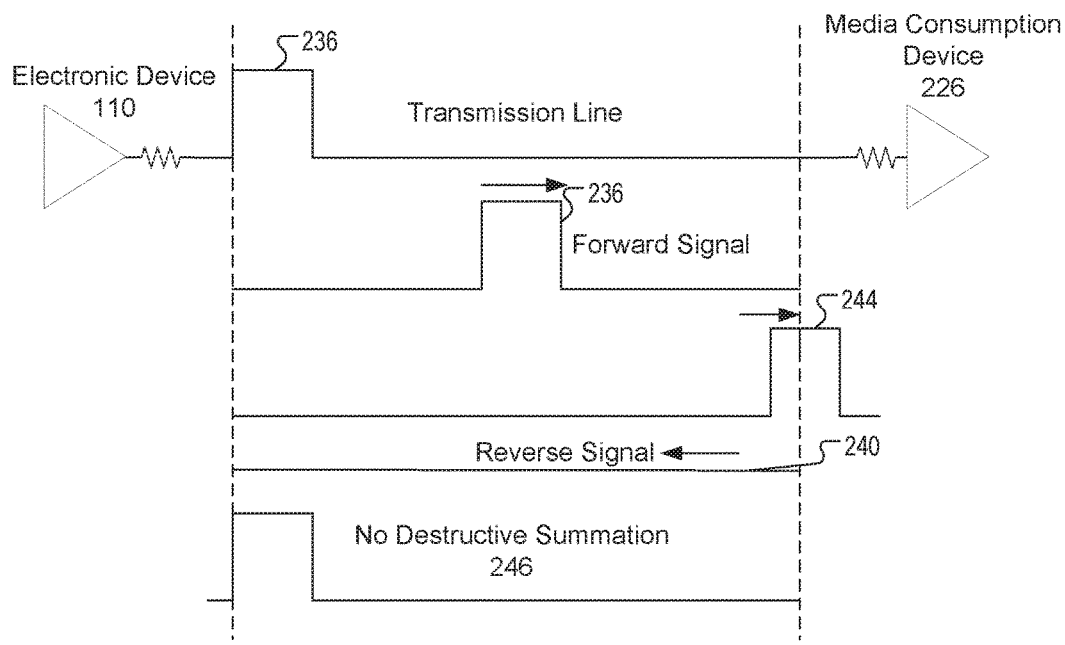
FIG. 2D illustrates an impedance match between the electronic device and the media consumption device according to one embodiment.

FIG. 2D illustrates an impedance match between the electronic device 110 and the media consumption device 226 according to one embodiment. Some numbers in FIG. 2D are similar to some numbers in FIGS. 2A, 2B, and 2C as noted by similar reference numbers, unless expressly described otherwise. As discussed herein, the signal shaping circuit 230 can adjust a signal sent from the electronic device 110 to match an impedance of the transmission line and the media consumption device 226. The signal shaping circuit 230 can use the impedance profiles to match the impedance of the signal sent from the electronic device 110 with the impedance of the transmission line and the media consumption device 226 to obtain a matching signal 244, as discussed in the proceeding paragraphs. For example, the signal shaping circuit 230 can use the impedance profiles to make the load impedance approximately match to the source impedance.

When the impedance of the signal sent from the electronic device 110 is matched with the impedance of the transmission line and the media consumption device 226, there is no reverse wave from the mismatch. When there is no impedance mismatch there is no destructive summation 246. An advantage of matching the impedance for the signal of the media item is to reduce or eliminate the flickering or stuttering when the signal is displayed on the media consumption device 226.

Returning to FIG. 2B, the high speed interface circuitry 118 can include the variable filter 232 coupled to the signal shaping circuit 230. In one embodiment, the variable filter 232 can be an adaptive filter circuit that can filter a signal based on different noises that are radiated from the high speed interface circuitry 118. The different noises radiated from the high speed interface circuitry 118 can be noises from the media consumption device displaying media items at different video resolution levels, where the media items at the different video resolution levels have different frequencies. For example, a media consumption device displaying a media item at a 1080P resolution level radiates different noise than the media consumption device displaying the media item at a 4K resolution level. In this example, the signal shaping circuit 230 can send filter instructions to the variable filter 232 to filter out noise from the different resolution levels.

Desense is a degradation in wireless receiver sensitivity due to noise coupling to the antenna 116 or 217. In one embodiment, desense can be caused by displaying a media item at different quality profiles, such as 720P, 1080P, and 4K resolution levels. The different resolution levels can exhibit different signal characteristics and may change over a period of the media consumption device 226 displaying the media item at different resolution levels causing change in desense. For example, the electronic device 110 can send a media item to the media consumption device 226 at a certain resolution level of 1080P with a noise radiation of −85 decibel-milliwatts (dBm). In this example, a sensitivity of the media consumption device 226 may be −92 dBm (e.g., Wi-Fi 11 g sensitivity), where a reliable data link can be maintained. When the resolution level changes, the noise can change its level to −85 dBM and a bit error rate (BER) may increase below an acceptable level and cause wireless connectivity issues.

In another embodiment, desense can be caused by a mismatch in frame rates between the electronic device 110 and the media consumption device 226. For example, when a frame rate of the electronic device 110 is set at 100 hertz (hz) and the frame rate for the media consumption device 226 is set to 50 hz for a 1080P resolution signal, desense can occur because the media consumption device 226 cannot properly display a signal with a motion flow of 100 hz. For example, when the desense occurs because of the frame rate mismatch, there may be stuttering in the signal as it is displayed on the media consumption device 226.

To adjust the variable filter 232 to mitigate desense, the SoC 120 can send a tuning instruction to the signal shaping circuit 230 to change filter characteristics of the signal shaping circuit 230 when there is a change in noise coupling. In one example, the desense can occur due to a change in a quality profile. For example, the signal shaping circuit 230 can send a tuning instruction to a tunable capacitor of the variable filter 232 to change a capacity of the tunable capacitor based on the video standard or frame rate of the signal being received by the antenna 116 or 217. The signal shaping circuit 230 can change the filter characteristics as the streaming quality switches.

One advantage of filtering out noise from the different resolution levels can be to decrease or eliminate stuttering in displaying a media item on the media consumption device 226. Another advantage of filtering out noise from the different resolution levels can be to increase a wireless connectivity performance of a wireless network by removing noise from the signal. As the frequency of operation for the electronic device 110 changes for different quality profiles, an amount of spurious emissions can also change. For example, a frequency of operations of the electronic device 110 can be 3 gigahertz (GHz) for a 4K resolution level, 1.5 GHZ for a 1080P resolution level, 750 MHz for a 720P resolution level, and so forth. As the frequency of operation increase, the noise coupling can also increase. The 3 GHz frequency of operation for the 4K resolution level can have a square wave pulse with more harmonic components in the frequency domain that increases noise coupling to likewise increase spurious emissions. The tunable capacitor of the variable filter 232 can be using the tuning instructions to reduce the noise coupling for the 3 GHz frequency of operation to increase the wireless connectivity performance by decreasing the spurious emissions.

Figure 2E:
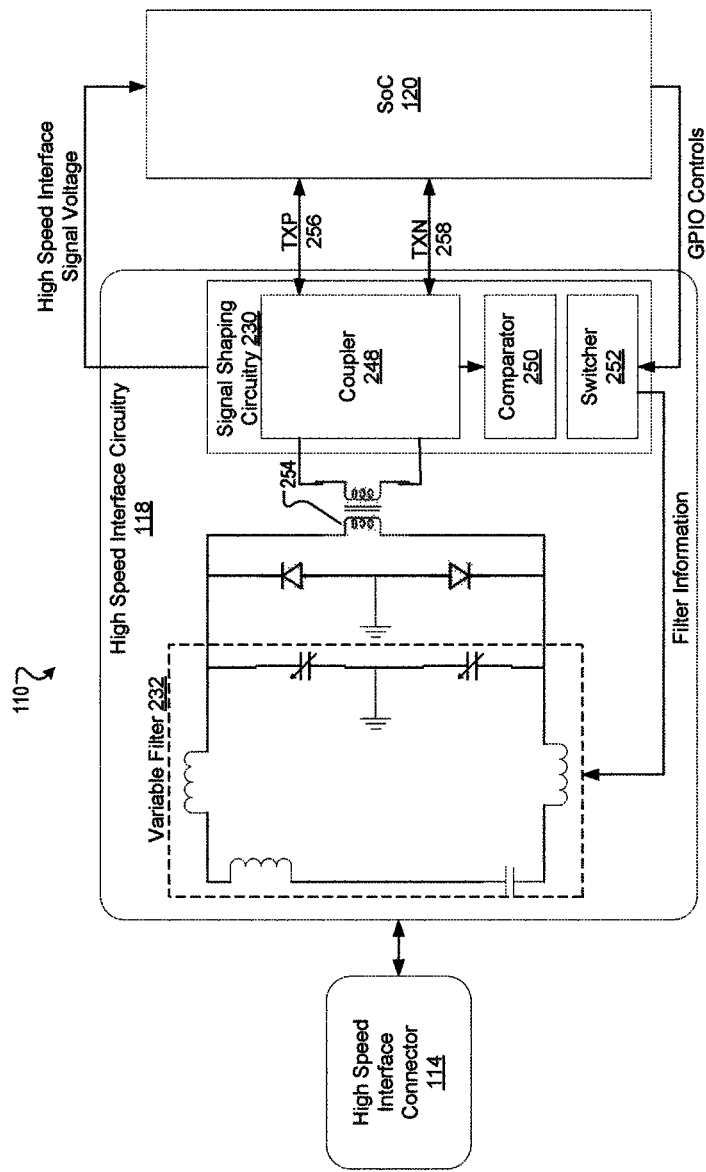
FIG. 2E illustrates another exposed view of the electronic device connecting to a media consumption device according to one embodiment.

FIG. 2E illustrates another exposed view of the electronic device 110 connecting to a media consumption device 226 according to one embodiment. Some numbers in FIG. 2E are similar to some numbers in FIGS. 1A, 2A, and 2B as noted by similar reference numbers, unless expressly described otherwise. In one embodiment, the SoC 120 can be connected to the signal shaping circuit 230 by transmission lines TXP 256 and TXN 258. The transmission lines TXP 256 and TXN 258 can be transmission lanes that the SoC 120 uses to send a signal to the high speed interface 118. The number of transmission lines illustrated is not intended to be limiting. For example, 2, 4, 6, or 8 transmissions can connect the SoC 120 to the signal shaping circuit 230. In another embodiment, the signal shaping circuit 230 can include a coupler 248 to couple the signals of the high speed interface circuitry 118 to the SoC 120. In one example, the coupler 248 can couple a proportion of power travelling in one transmission line out through another connection or port. In another example, the coupler can duplicate an original signal received at the electronic device 110 to obtain a duplicate signal and send the duplicate signal to the SoC 120. In one example, the original signal is the signal received by the antenna that has not been adjusted or modified 116 or 217. The SoC 120 can monitor for a change between the duplicate signal and the original signal without affecting the original signal.

RF directional couplers can be implemented using a variety of techniques including stripline, coaxial feeder and lumped or discrete elements. They may also be contained within a variety of packages from blocks with RF connectors, or solder pins, or they may be contained on a substrate carrier, or they may be constructed as part of a larger unit containing other functions.

In one embodiment, a common mode choke 254 can couple the signal shaping circuit 230 to the variable filter 232 of the high speed interface circuitry 118. The common mode choke 254 can remove common mode noise. For example, the high speed interface circuitry 118 can use the common mode choke 254 to prevent common mode noise.

In another embodiment, the signal shaping circuit 230 can include a comparator 250. The comparator 250 can receive signal information from the coupler 248. The signal information can include impedance profile information for the lookup table in the SoC 120. When a voltage or current of a load, such as the media consumption device 226 changes, the comparator 250 can determine the change in voltage and retrieve an impedance profile from the SoC 120 for the voltage change. The signal shaping circuit 230 can correct the signal by correcting the voltage until an impedance level of the electronic device 110 matches an impedance level of the media consumption device 226.

The signal shaping circuit 230 can include a switcher 252 that can determine when a quality profile of a media item changes. For example, the switcher 252 can determine a video resolution level for a media item using a received signal strength indicator (RSSI) value of a signal received from the SoC 120 over the general-purpose input/output (GPIO) control lines. For example, for a video resolution level of 1080P the RSSI value of the signal is 800 milli-volts peak to peak voltage. In another example, for a video resolution level of 720P the RSSI value of the signal is 550 milli-volts peak to peak voltage.

In one example, the signal shaping circuit 230 can use a voltage waveform and the current level of a signal received from the SoC to determine what impedance profile to use. For example, the impedance profile can include a voltage waveform or a current level. In this example, the SoC 120 can select the impedance profile by matching an amplitude of the voltage waveform or a current level of the signal to the voltage waveform or the current level of the impedance profile. The signal shaping circuit 230 can send a tuning instruction to the variable filter 232 to change a capacitance of a variable capacitor for different video resolution levels.

Figure 3:
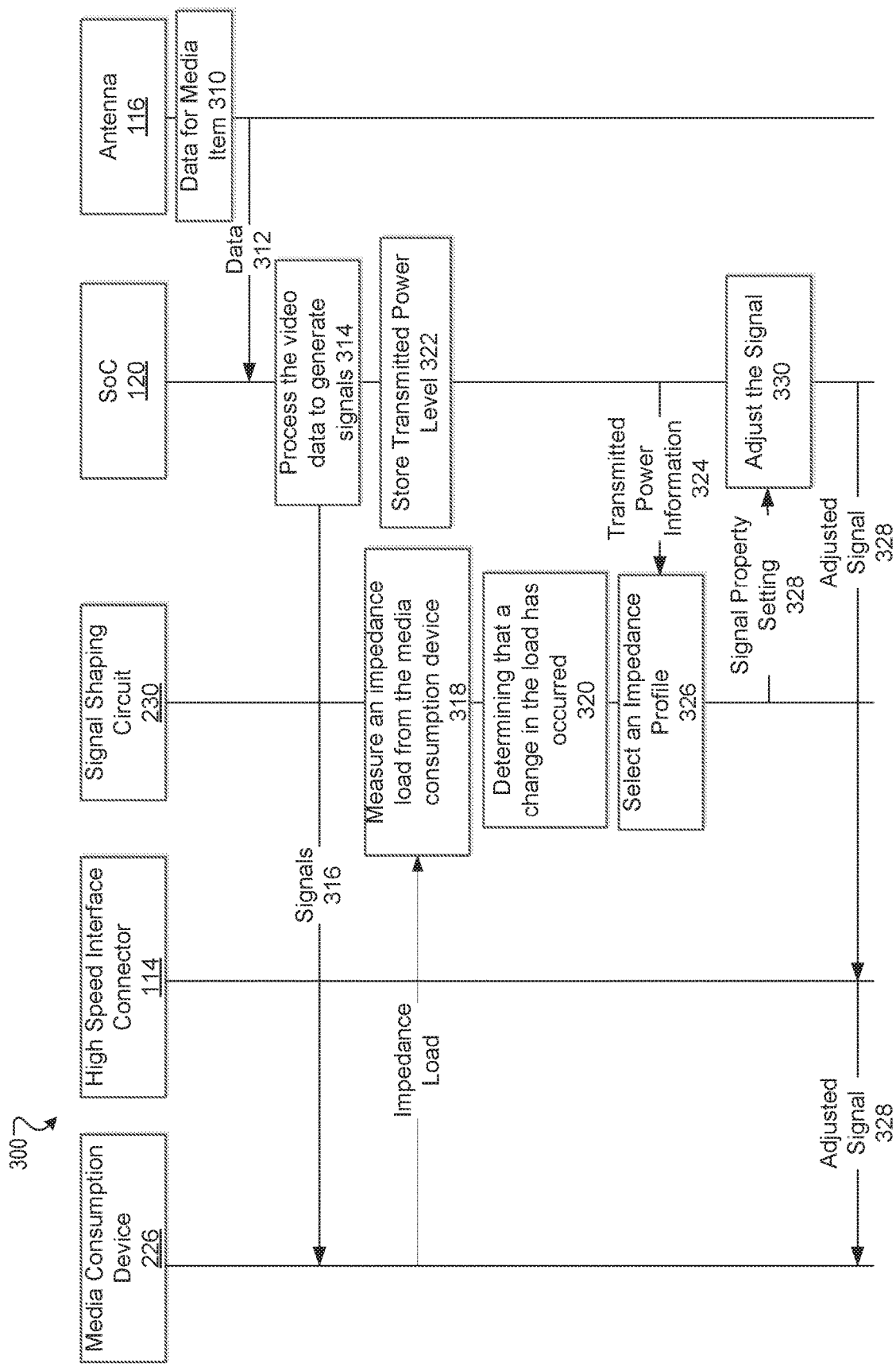
FIG. 3 illustrates a diagram of a method for adjusting a signal for impedance mismatching at the electronic device according to one embodiment.

FIG. 3 illustrates a diagram of a method 300 for adjusting a signal for impedance mismatching at the electronic device 110 according to one embodiment. The method 300 may at least partially be performed by processing logic that includes hardware (e.g., circuitry, dedicated logic, programmable logic, microcode, etc.), software (e.g., instructions executed by a processing device), firmware or a combination thereof. The method 300 may be performed, at least in part, by the electronic device 110 or the media consumption device 226 of FIG. 1A, 1B, 2A, 2B, or 2E.

The method begins with include the antenna 116 receiving a data for a media item (310). For example, the electronic device 110 can receive, via the antenna, data representing at least a portion of a video. The method can include the SoC 120 receiving the signal from the antenna 116 (312). The method can include processing the data to generate signals to send to the media consumption device 226 via the high speed interface connector 114 (314). The method can include sending, from the SoC 120, at least one of the signals to the media consumption device 226 (316). In one example, the SoC 120 can send least one of the signals using a first amplitude value of a first voltage of the signal at a first transmit power level. In another example, the SoC 120 can send least one of the signals using a first current value.

The method can include with measuring, by the signal shaping circuit 230, the impedance load at the high speed interface connector 114 (318). The impedance load can be generated by the media consumption device 226. The method can include determining, by the signal shaping circuit 230, that a change in the impedance load has occurred (320). For example, the signal shaping circuit 230 can detect a change between the first impedance load value and a second impedance load, wherein the change is indicative of an impedance mismatch between the media consumption device 226 and the electronic device 110.

In one example, the signal shaping circuit 230 can store a previous impedance load value that it compares to the current impedance load value to determine when there is a change in the impedance load. In another example, the signal shaping circuit 230 can determine that the first impedance load value is different than a second impedance load value, where the second impedance load value is a previous impedance load value caused by the media consumption device 226. The method can include the SoC 120 storing transmit power information for the signal (322). The transmit power can be the power used to transmit the media signal over the high speed interface connector 114. The method can include receiving, at the signal shaping circuit 230, a first value of the first transmit power level from the SoC 120 (324). The SoC 120 can transmit a signal without using the high speed interface circuitry 118. The first transmit power level can be used by the SoC 120 before the signal is adjusted. The method can include selecting, by the signal shaping circuit 230, an impedance profile by comparing the transmit power information to the impedance load (326). In one example, the SoC 120 can store impedance profiles in a lookup table (LUT) that are associated with the transmit power information and the impedance level information. In this example, the comparator 250 (FIG. 2E) of the signal shaping circuit 230 can select the impedance profile that is associated with the transmit power information and the impedance level information. In another example, the signal shaping circuit 230 can determine a second amplitude value of a second voltage level of a signal at a second transmit power level corresponding to an impedance profile using the first impedance load value and the first value of the first transmit power level, where the impedance profile is stored in an entry of a lookup table (LUT) of the SoC, the entry includes a stored impedance load value that matches the first impedance load value and a stored value that matches the first value of the first transmit power level. In another example, the signal shaping circuit 230 can determine a second current value corresponding to the impedance profile using the first current level and the first value of the first transmit power level, where the entry includes the stored impedance load value that matches the first current level and the stored value that matches the first value of the first transmit power level.

The method can include sending, from the signal shaping circuit 230, a signal property setting associated with the impedance profile to the SoC 120 (328). In one example, the signal shaping circuit 230 can send the second amplitude value of the second voltage level of the signal at the second transmit power level to the SoC 120. In another example, the signal shaping circuit 230 can send the second current value to the SoC.

The method can include adjusting the signal using the SoC 120 to obtain an adjusted signal (326). In one embodiment, the SoC 120 can adjust an amplitude of the signals from the first amplitude value of the first voltage level of the signal to the second amplitude value of the second voltage level of the signal to obtain adjusted signals, where the adjusted signals are the remaining signals for at least the portion of the video adjusted to compensate for an impedance mismatch between the video display device and the device. In another embodiment, the SoC 120 can adjust a current level of the signals from the first current to the second current value to obtain adjusted signals. In another embodiment, the SoC 120 can adjust the signal using the signal property setting to match the impedance load value for the media consumption device 226. In another example, the SoC 120 can adjust a voltage or a current of the video signals according to the voltage or the current setting to obtain adjusted video signals, where the adjusted video signals are the video signals adjusted to match the second impedance load value. In another embodiment, the SoC 120 can adjust a subsequent signal to match the impedance load value. The method can include sending the adjusted signal from the SoC 120 via the high speed interface to the media consumption device 226 to be consumed or displayed on a display (328).

Figure 4:
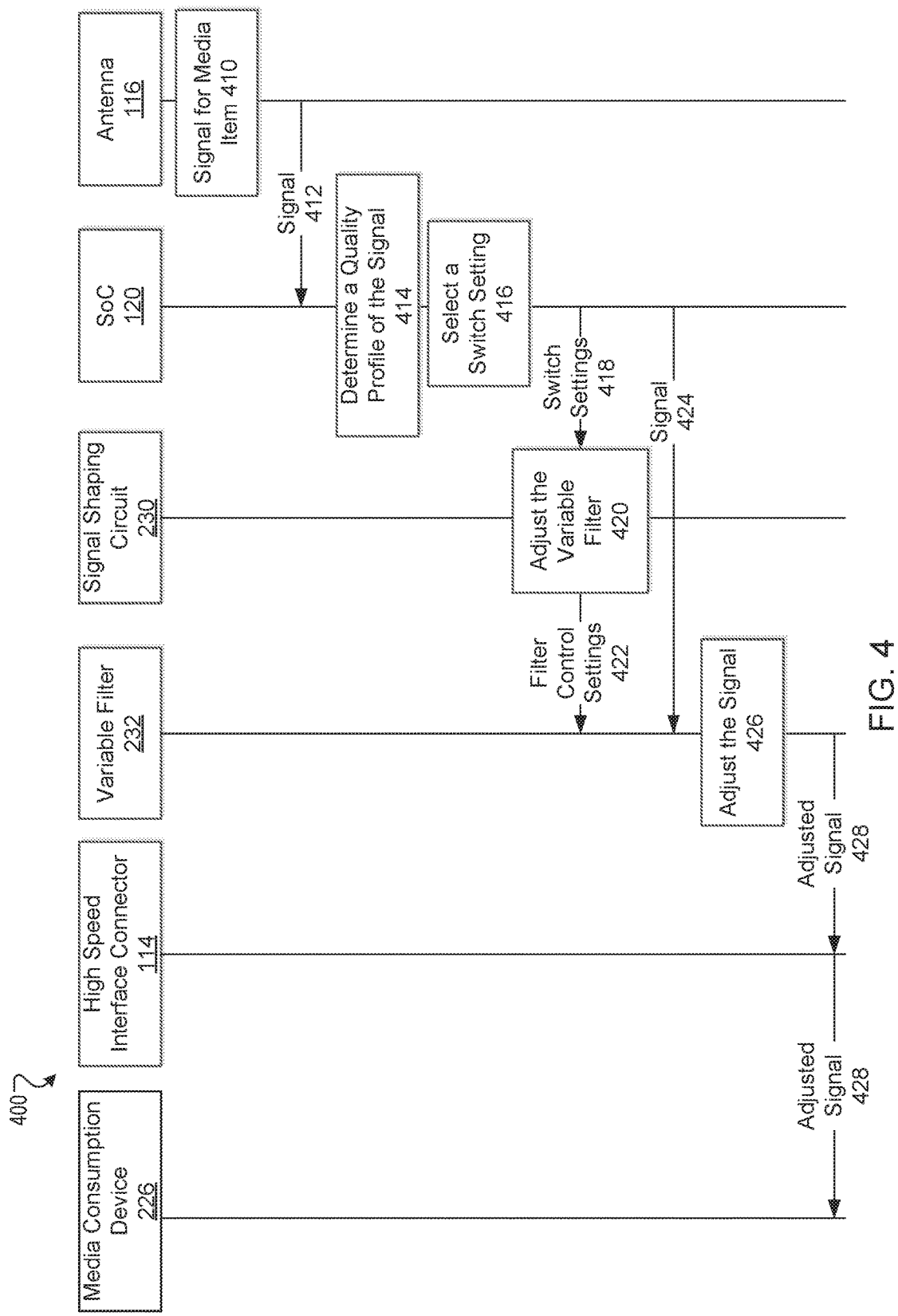
FIG. 4 illustrates a diagram of a method for filtering a signal for noise using a variable filter according to one embodiment.

FIG. 4 illustrates a diagram of a method 400 for filtering a signal for noise using the variable filter 232 according to one embodiment. The method 400 may at least partially be performed by processing logic that includes hardware (e.g., circuitry, dedicated logic, programmable logic, microcode, etc.), software (e.g., instructions executed by a processing device), firmware or a combination thereof. The method 400 may be performed, at least in part, by the electronic device 110 or the media consumption device 226 of FIG. 1A, 1B, 2A, 2B, or 2E.

The method begins the antenna 116 receiving a signal for a media item (410). The method can include the SoC 120 receiving the signal for media content from the antenna 116 (412). The method can include determining a quality profile for the signal using the SoC 120 (414). For example, the SoC 120 can use the comparator 250 (FIG. 2) to determine the quality profile, as discussed in the preceding paragraphs. The method can include selecting a for switch setting associated with the quality profile (416). In one example, the SoC 120 can include a lookup table (LUT) to store switch settings associated with different quality profiles.

The method can include sending the switch settings associated with the quality profile from the SoC 120 to the signal shaping circuit 230 (418). The switch settings can be instructions to the signal shaping circuit 230 for setting to set the variable filter 232 to filter noise. For example, the switch settings can include settings that the switcher 252 (FIG. 2E) of the signal shaping circuit 230 uses to set the variable filter. The switcher 252 can determine the settings for the variable filter 418 to filter noise using the switch settings (420). The method can include sending, to the variable filter 232, filter control settings from the switcher 252 to set switches or variable capacitors of the variable filter 232 (422).

The method can include sending the signal from the SoC 120 to the variable filter 232 via the signal shaping circuit 230 (424). The method can include adjusting, by the variable filter 232, the signal using the filter instructions to obtain an adjusted signal (426). The method can include sending the adjusted signal from the variable filter 232 via the high speed interface circuitry 118 to the media consumption device 226 (428). In one example, the adjusted signal can be displayed on the media consumption device without stuttering or pausing.

Figure 5:
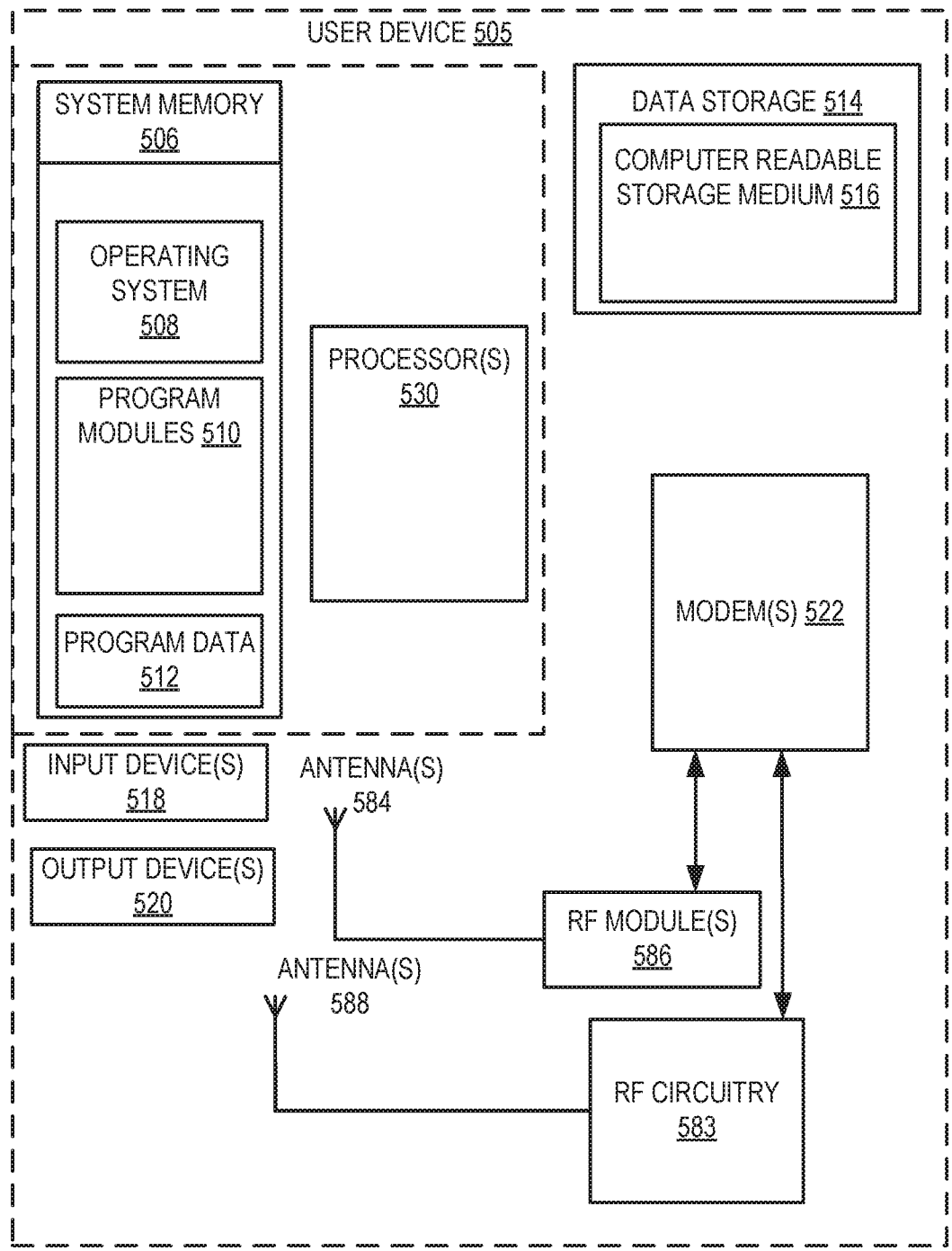
FIG. 5 is a block diagram of an electronic device in which embodiments of a radio device with an antenna structure may be implemented.

FIG. 5 is a block diagram of an electronic device 505 in which embodiments of an antenna structure 500 may be implemented. The electronic device 505 may correspond to the electronic device in FIG. 1A, 1B, 2A, 2B, or 2E. The electronic device 505 may be any type of computing device such as an electronic book reader, a PDA, a mobile phone, a laptop computer, a portable media player, a tablet computer, a camera, a video camera, a netbook, a desktop computer, a gaming console, a DVD player, a Blu-ray®, a computing pad, a media center, a voice-based personal data assistant, and the like. The electronic device 505 may be any portable or stationary electronic device. For example, the electronic device 505 may be an intelligent voice control and speaker system. Alternatively, the electronic device 505 can be any other device used in a WLAN network (e.g., Wi-Fi® network), a WAN network, or the like.

The electronic device 505 includes one or more processor(s) 530, such as one or more CPUs, microcontrollers, field programmable gate arrays, or other types of processors. The electronic device 505 also includes system memory 506, which may correspond to any combination of volatile and/or non-volatile storage mechanisms. The system memory 506 stores information that provides operating system component 508, various program modules 510, program data 512, and/or other components. In one embodiment, the system memory 506 stores instructions of the methods as described herein. The electronic device 505 performs functions by using the processor(s) 530 to execute instructions provided by the system memory 506.

The electronic device 505 also includes a data storage device 514 that may be composed of one or more types of removable storage and/or one or more types of non-removable storage. The data storage device 514 includes a computer-readable storage medium 516 on which is stored one or more sets of instructions embodying any of the methodologies or functions described herein. Instructions for the program modules 510 may reside, completely or at least partially, within the computer-readable storage medium 516, system memory 506 and/or within the processor(s) 530 during execution thereof by the electronic device 505, the system memory 506 and the processor(s) 530 also constituting computer-readable media. The electronic device 505 may also include one or more input devices 518 (keyboard, mouse device, specialized selection keys, etc.) and one or more output devices 520 (displays, printers, audio output mechanisms, etc.).

The electronic device 505 further includes a modem 522 to allow the electronic device 505 to communicate via a wireless network (e.g., such as provided by the wireless communication system) with other computing devices, such as remote computers, an item providing system, and so forth. The modem 522 can be connected to RF circuitry 583 and zero or more RF modules 586. The RF circuitry 583 may be a WLAN module, a WAN module, PAN module, or the like. Antennas 588 are coupled to the RF circuitry 583, which is coupled to the modem 522. Zero or more antennas 584 can be coupled to one or more RF modules 586, which are also connected to the modem 522. The zero or more antennas 584 may be GPS antennas, NFC antennas, other WAN antennas, WLAN or PAN antennas, or the like. The modem 522 allows the electronic device 505 to handle both voice and non-voice communications (such as communications for text messages, multimedia messages, media downloads, web browsing, etc.) with a wireless communication system. The modem 522 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 522 may generate signals and send these signals to antenna 588 and 584 via RF circuitry 583 and RF module(s) 586 as described herein. Electronic device 505 may additionally include a WLAN module, a GPS receiver, a PAN transceiver and/or other RF modules. These RF modules may additionally or alternatively be connected to one or more of antennas 584, 588. Antennas 584, 588 may be configured to transmit in different frequency bands and/or using different wireless communication protocols. The antennas 584, 588 may be directional, omnidirectional, or non-directional antennas. In addition to sending data, antennas 584, 588 may also receive data, which is sent to appropriate RF modules connected to the antennas.

In one embodiment, the electronic device 505 establishes a first connection using a first wireless communication protocol, and a second connection using a different wireless communication protocol. The first wireless connection and second wireless connection may be active concurrently, for example, if an electronic device is downloading a media item from a server (e.g., via the first connection) and transferring a file to another electronic device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 522 is shown to control transmission and reception via antenna (584, 588), the electronic device 505 may alternatively include multiple modems, each of which is configured to transmit/receive data via a different antenna and/or wireless transmission protocol.

The electronic device 505 delivers and/or receives items, upgrades, and/or other information via the network. For example, the electronic device 505 may download or receive items from an item providing system. The item providing system receives various requests, instructions and other data from the electronic device 505 via the network. The item providing system may include one or more machines (e.g., one or more server computer systems, routers, gateways, etc.) that have processing and storage capabilities to provide the above functionality. Communication between the item providing system and the electronic device 505 may be enabled via any communication infrastructure. One example of such an infrastructure includes a combination of a wide area network (WAN) and wireless infrastructure, which allows a user to use the electronic device 505 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products using the Wi-Fi® technology based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the electronic device 505.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The electronic devices 505 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices 505 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "ally inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A device comprising:
a housing;
a first High-Definition Multimedia Interface (HDMI) connector integrated into the housing at a first end, the first HDMI connector shaped to connect to a second HDMI connector of a video display device;
an antenna disposed within the housing;
a system on a chip (SoC) disposed within the housing and coupled to the antenna, the SoC to:
receive data via the antenna;
process the data to generate signals to send to the video display device via the first HDMI connector; and
send at least one of the signals to the video display device using a first amplitude value of a first voltage waveform at a first transmit power level; and
high-speed interface circuitry disposed within the housing and coupled between the SoC and the HDMI connector, the high speed interface circuitry comprising a signal shaping circuit to:
measure a first impedance load value at the HDMI connector caused by the video display device;
detect a change between the first impedance load value and a second impedance load, wherein the change is indicative of an impedance mismatch between the video display device and the device;
receive a first value of the first transmit power level from the SoC;
determine a second amplitude value of a second voltage level of the signal at a second transmit power level corresponding to an impedance profile using the first impedance load value and the first value of the first transmit power level, wherein the impedance profile is stored in an entry of a lookup table (LUT) of the SoC, the entry comprising a stored impedance load value that matches the first impedance load value and a stored value that matches the first value of the first transmit power level;
send the second amplitude value of the second voltage level of the signal at the second transmit power level to the SoC, and
wherein the SoC is to:
adjust an amplitude of the signals from the first amplitude value of the first voltage level to the second amplitude value of the second voltage level to obtain adjusted signals to compensate for the change between the first impedance load value and a second impedance load; and
send the adjusted signals to the video display device to display the video.

2. The device of claim 1, wherein the impedance mismatch between the first impedance load value and the second impedance load value causes a reverse signal that interferes with at least one of the signals sent to the video display device, wherein the signal shaping circuit is to adjust the amplitude of the signals to reduce an amplitude of the reverse signal.

3. The device of claim 2, wherein:
the SoC is further to:
send at least one of the signals to the video display device at first current level;
the signal shaping circuit is further to:
determine a second current level corresponding to the impedance profile using the first current level and the first value of the first transmit power level, wherein the entry comprises the stored impedance load value that matches the first current level and the stored value that matches the first value of the first transmit power level; and
send the second current value to the SoC; and
wherein the SoC is to adjust a current value of the signals from the first current value to the second current value to obtain the adjusted signals.

4. An apparatus comprising:
a data interface connector;
an application processor to receive signals via an antenna; and interface circuitry coupled between the application processor and the data interface connector, wherein the interface circuitry is to:
  determine a change in a signal property of one of the signals, the change being caused by an impedance mismatch between the data interface connector and a media consumption device; and
  send the application processor a signal property setting corresponding with the change;
wherein the application processor is to:
  adjust the signal property of a subsequent one of the signals, in response to the signal property setting from the interface circuitry, to obtain an adjusted signal; and
  send the adjusted signal to the media consumption device.

5. The apparatus of claim 4, wherein:
the signal property is a first peak-to-peak amplitude of the voltage of one of the signals, and
the first peak-to-peak amplitude is adjusted to a second peak-to-peak amplitude to compensate for the impedance mismatch.

6. The apparatus of claim 4, wherein:
the signal property is a current level of the signals, and
the current level of the signals is adjusted to compensate for the impedance mismatch.

7. The apparatus of claim 4, wherein the application processor is further to:
determine a quality profile of the signals;
select a filter profile corresponding to the quality profile, wherein the filter profile comprises a switch setting; and
send, to the interface circuitry, the switch setting.

8. The apparatus of claim 7, wherein the interface circuitry further comprises:
a variable filter comprising a variable capacitor; and
a signal shaping circuit coupled to the variable filter, wherein the signal shaping circuit is to:
  receive the filter setting from the application processor;
  adjust the variable capacitor according to the filter setting; and
  generate a filtered signal.

9. The apparatus of claim 8, wherein the interface circuitry further comprises a common mode choke coupled between the signal shaping circuit and the variable filter, wherein the common mode choke is to remove common mode noise in the signals.

10. The apparatus of claim 7, wherein the application processor further comprises a table that includes entries that store information linking switch settings and their respective quality profiles wherein at least one of the entries stores the quality profile and the switch setting.

11. The apparatus of claim 7, wherein:
the quality profile comprises a video resolution level, wherein the video resolution level is at least one of:
  720 pixels of vertical resolution;
  1080 pixels of vertical resolution;
  4000 pixels of vertical resolution; or
  8000 pixels of vertical resolution,
the variable filter is to filter a noise signal from the signals, wherein the noise signal is associated with the video resolution level; and
a frequency of the noise signal is different for at least two of the video resolution levels.

12. The apparatus of claim 7, wherein the signal shaping circuit is further to:

measure a first impedance load value at the interface connector, the first impedance load value caused by at least the media consumption device;
determine that the first impedance load value is different than a second impedance load value, wherein the second impedance load value is a previous impedance load value caused by at least the media consumption device;
select an impedance profile stored in a table of the application processor; and
send the signal property setting to the application processor, the signal property setting corresponding to the impedance profile.

13. The apparatus of claim 7, further comprising a switcher that receives a received signal strength indicator (RSSI) value of the signal from the application processor to determine that the quality profile of the media item changed.

14. The apparatus of claim 4, further comprising a power management system to provide power to the apparatus, wherein the power management system receives power from the interface connector.

15. The apparatus of claim 4, further comprising a coupler coupled to the application processor via transmission lines, the coupler to:
duplicate the signals received by the antenna to obtain duplicate signals; and
send the duplicate signal to a comparator coupled to the coupler.

16. The apparatus of claim 15, wherein:
the comparator is to:
  determine a change in a signal property between the signals and the duplicate signals; and
  identify the signal property setting in the table of the application processor for the change in the signal property; and
the application processor is to send the adjusted signal in response to the change in the signal property.

17. A method comprising:
receiving, at a signal shaping circuit, a signal for a media item from a system on a chip (SoC);
measuring, by the signal shaping circuit, a first impedance load value from a media consumption device;
measuring, by the signal shaping circuit, a change in the first impedance load value to a second impedance load value;
receiving, at the signal shaping circuit, a transmit power information for the signal from the SoC;
selecting, at the signal shaping circuit, an impedance profile, wherein the impedance profile comprises signal property setting associated with an impedance profile from the SoC;
sending, to the SoC, a signal property setting;
adjusting, by the SoC, a signal property of the signal using the signal property setting to obtain an adjusted signal; and
sending, from the SoC, the adjusted signal to the media consumption device.

18. The method of claim 17, wherein the first impedance load value comprises: a portion of the first impedance load value contributed by an impedance load value of the media consumption device, the portion of the first impedance load value contributed a connector coupled to the media consumption device, or a combination thereof.

19. The method of claim 17, further comprising storing a first impedance profile associated with the first impedance load value and a second profile associated with the second impedance load value in a table of the SoC, wherein the first impedance load value is associated with a first media consumption device and the second impedance load value is associated with a second media consumption device.

20. The method of claim 18, wherein:
   the first impedance load value and the second impedance load value change a signal property of the signal for the media item, and
   the signal property comprises at least one of:
      a waveform shape of the signal;
      a peak to peak voltage swing of the signal; or
      a current draw from the SoC for the signal.

\* \* \* \* \*